United States Patent
Koganehira et al.

(10) Patent No.: US 7,156,910 B2
(45) Date of Patent: Jan. 2, 2007

(54) YELLOW INK COMPOSITION, INK SET, AND RECORDING METHOD, RECORDING SYSTEM AND RECORDED MATTER WHICH USE THE INK COMPOSITION AND INK SET

(75) Inventors: Shuichi Koganehira, Nagano-ken (JP); Hironori Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/116,947

(22) Filed: Apr. 28, 2005

(65) Prior Publication Data

US 2005/0248643 A1 Nov. 10, 2005

(30) Foreign Application Priority Data

Apr. 28, 2004 (JP) .............................. 2004-133876
Apr. 28, 2004 (JP) .............................. 2004-133893

(51) Int. Cl.
*C09D 11/00* (2006.01)
*C09D 11/02* (2006.01)

(52) U.S. Cl. ............... 106/31.6; 106/31.77; 106/31.78; 106/31.81; 106/31.86

(58) Field of Classification Search ............. 196/31.27, 196/31.6, 31.58, 31.86; 106/31.6, 31.77, 106/31.78, 31.81, 31.86
See application file for complete search history.

(56) References Cited

U.S. PATENT DOCUMENTS

| 4,255,375 A | 3/1981 | Macpherson et al. |
| 4,880,472 A | 11/1989 | Bugnon et al. |
| 4,889,562 A | 12/1989 | Bugnon et al. |

(Continued)

FOREIGN PATENT DOCUMENTS

EP 1 146 094 10/2001

(Continued)

OTHER PUBLICATIONS

Patent Abstracts of Japan of JP 2002-105368 dated Apr. 10, 2002 and JPO English computer translation.

(Continued)

*Primary Examiner*—Helene Klemanski
(74) *Attorney, Agent, or Firm*—Ladas and Parry LLP

(57) ABSTRACT

It is an object of the present invention to provide a yellow ink composition which is superior in terms of color reproducibility not only in the high-brightness (high-L*) region, but also in the low-brightness yellow region, i.e., in the region of "low L*, a* close to zero, and high b*", and an ink set equipped with a yellow ink which has a brightness that is high enough that graininess can be sufficiently suppressed, and which is also superior in terms of color reproducibility in the low-brightness yellow region, i.e., in the region of "low L*, a* close to zero, and high b*". The present invention provides a yellow ink composition in which the Y value is 86 or greater when the Z value in the XYZ display system stipulated by the CIE is 23. Furthermore, the present invention also provides a yellow ink composition which contains a metal complex pigment. In particular, the yellow ink composition of the present invention can express a low-brightness yellow color with good reproducibility. Moreover, the present invention provides an ink set containing a yellow ink in which the Y value is 86 or greater when the Z value in the XYZ display system stipulated by the CIE is 23, as calculated from the ultraviolet-visible transmission spectrum of an aqueous solution diluted 10,000 times by weight or lower.

23 Claims, 4 Drawing Sheets

U.S. PATENT DOCUMENTS

| | | | |
|---|---|---|---|
| 6,465,567 B1 * | 10/2002 | Grobe et al. | 524/611 |
| 6,602,333 B1 * | 8/2003 | Miyabayashi | 106/31.27 |
| 6,648,954 B1 * | 11/2003 | Uemura et al. | 106/31.85 |
| 2003/0035034 A1 | 2/2003 | Fukumoto et al. | |
| 2004/0094067 A1 * | 5/2004 | Oyanagi et al. | 106/31.58 |
| 2004/0176499 A1 | 9/2004 | Herrmann et al. | |

FOREIGN PATENT DOCUMENTS

| | | |
|---|---|---|
| EP | 1 391 301 | 2/2004 |
| EP | 1 454 964 | 9/2004 |
| JP | 2001-081369 | 3/2001 |
| JP | 2001-272529 | 10/2001 |
| JP | 2001-287353 | 10/2001 |
| JP | 2002-105368 | 4/2002 |
| JP | 2002-356602 | 12/2002 |
| JP | 2003-313480 | 11/2003 |
| WO | 03/027162 | 4/2003 |
| WO | 2004/108841 | 12/2004 |

OTHER PUBLICATIONS

Patent Abstracts of Japan of JP 2003-313480 dated Nov. 6, 2003 and JPO English computer translation.

Patent Abstracts of Japan of JP 2001-081369 dated Mar. 27, 2001 and JPO English computer translation.

Patent Abstracts of Japan of JP 2001-272529 dated Oct. 5, 2001 and JPO English computer translation.

Patent Abstracts of Japan of JP 2001-287353 dated Oct. 16, 2001 and JPO English computer translation.

Patent Abstracts of Japan of JP 2002-356602 dated Dec. 13, 2002 and JPO English computer translation.

* cited by examiner

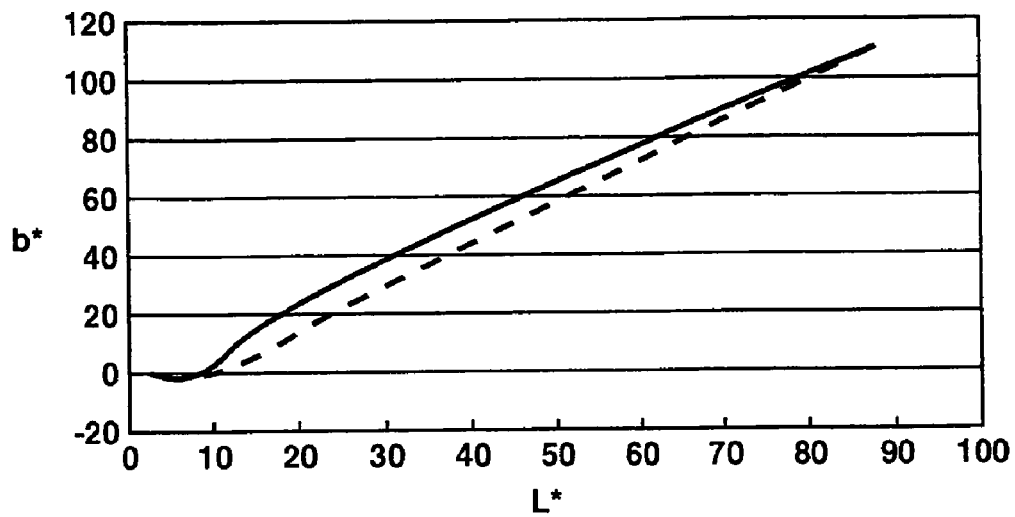
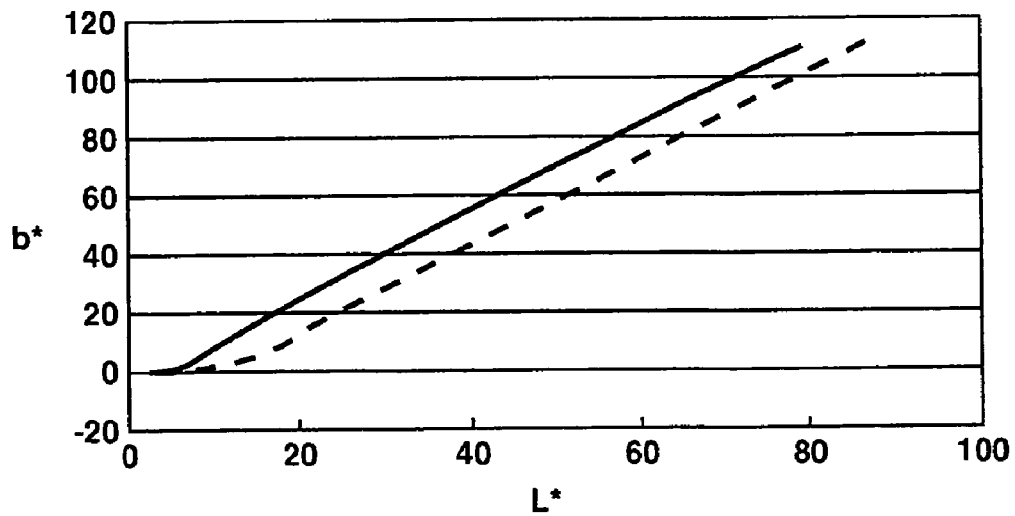

(RED REGION COLOR PEPRODUCIBILITY (1))

- EXAMPLE 1
- × COMPARATIVE EXAMPLE 1

(RED REGION COLOR PEPRODUCIBILITY (2))

- EXAMPLE 2
- × COMPARATIVE EXAMPLE 2
- ◇ EXAMPLE 3

(GREEN REGION COLOR PEPRODUCIBILITY (1))

- EXAMPLE 1
- × COMPARATIVE EXAMPLE 1

(GREEN REGION COLOR PEPRODUCIBILITY (2))

- EXAMPLE 2
- × COMPARATIVE EXAMPLE 2

YELLOW INK COMPOSITION, INK SET, AND RECORDING METHOD, RECORDING SYSTEM AND RECORDED MATTER WHICH USE THE INK COMPOSITION AND INK SET

CROSS-REFERENCES

BACKGROUND

The present invention relates to a yellow ink composition containing a metal complex pigment, and an ink set using this yellow ink composition, and more particularly relates to a yellow ink composition with high color reproducibility in the high b* and low L* regions in the L*a*b* display system stipulated by the CIE, and an ink set which comprises at least a specified yellow ink, and which is superior in terms of the color reproducibility of recorded images.

Conventionally, the yellow inks provided in ink sets used for color ink jet recording have been inks with a relatively high brightness in order to prevent a state in which dots are visually recognized by the eye in granular form in cases where images are expressed by such dots. For example, high-brightness yellow inks are "high L*, a* close to zero, and high b*" according to the Lab color display system stipulated by the CIE (Commission Internationale d'Eclairage).

When yellow inks that are "high L*, a* close to zero, and high b*" are used, the following problem arises: namely, while graininess is improved, the reproducibility of color with a high b* value is insufficient in the moderate to low brightness region with an L* value (brightness) of approximately 60 or less.

In order to solve such problems, a method has been proposed in which ink sets that are further equipped with a low-brightness yellow ink called "dark yellow" in addition to a high-brightness yellow ink are used (for example, see Japanese Patent Application Laid-Open No. 2002-105368).

Furthermore, a method is also used in which a high b* value is realized in the moderate to low brightness region by increasing the pigment solid content contained in the yellow ink (for example, see Japanese Patent Application Laid-Open No. 2003-313480).

Meanwhile, a method has also been disclosed in which a broad rang of color reproducibility in the yellow region is obtained by means of a yellow ink composition which contains two types of yellow pigments, i.e., C. I. pigment yellow 128 and C. I. pigment yellow 110 (for example, see Japanese Patent Application Laid-Open No. 2001-081369).

However, in the case of methods using dark yellow, the number of ink colors is increased so that ink preparation becomes more complicated, and the cost also tends to increase, and in the case of methods in which the pigment solid content is increased, there are cases in which this leads to a deterioration in luster.

In the case of a method that blends C. I. pigment yellow 128 and C. I. pigment yellow 110, color reproducibility can be obtained over a broader range than is possible in the case of inks that contain only one type of pigment; however, the color reproducibility of dark parts in the yellow region is insufficient. Furthermore, since pigments with widely separated color phase angles are mixed, the saturation of secondary colors tends to drop, and C. I. pigment yellow 110 in particular shows a reddish tinge, so that green shows a low saturation when this pigment is used in the ink set.

Accordingly, it is an object of the present invention to provide a yellow ink composition which is superior in terms of color reproducibility not only in the high-brightness (high-L*) region, but also in the low-brightness yellow region, i.e., the region of "low L*, a* close to zero, and high b*".

Furthermore, it is also an object of the present invention to provide an ink set equipped with a yellow ink which is superior in terms of color reproducibility not only in the high-brightness (high-L*) region, but also in the low-brightness yellow region, i.e., the region of "low L*, a* close to zero, and high b*".

SUMMARY

As a result of diligent research, the present inventors made the following discoveries: namely, a yellow ink composition which satisfies the condition of having a Y value of 86 or greater in a case where the Z value in the XYZ display system stipulated by CIE is 23 is superior in terms of color reproducibility in the region of "low L*, a* close to zero, and high b"; furthermore, a yellow ink composition containing a metal complex pigment satisfies the abovementioned condition, and a yellow ink composition which contains a pigment that is superior in terms of reproducibility of the high-b* region at a high L* in addition to a metal complex pigment is superior in terms of color reproducibility in a broad region extending from high L* values to low L* values, and can faithfully reproduce yellow colors that occur in the natural world.

The present invention was devised on the basis of the abovementioned findings, and provides a yellow ink composition which has a Y value of 86 or greater when the Z value in the XYZ display system stipulated by the CIE is 23. As a result of such a construction, a low-brightness yellow color can be expressed with good reproducibility.

The present invention provides a yellow ink composition containing a metal complex pigment. Such a composition satisfies a condition of having a Y value of 86 or greater, when the Z value in the XYZ display system stipulated by the CIE is 23, as calculated from the ultraviolet-visible transmission spectrum of an aqueous solution diluted 10,000 times by weight or lower.

Furthermore, the present invention provides a yellow ink composition which contains a metal complex pigment. As a result of such a construction, yellow colors can be expressed with good reproducibility over a broad region extending from high brightness values to low brightness values.

The yellow ink composition of the present invention is superior in terms of yellow color reproducibility and color stability over a broad region ranging from high L* values to low L* values, and allows the adjustment of a high-b* pure yellow color in the vicinity of the a* axis even if another ink such as cyan or the like is not mixed.

Furthermore, the present invention also provides a recording method for forming images using the abovementioned yellow ink composition. By using this recording method, it is possible to obtain good-quality recorded images which are superior in terms of color reproducibility in the high-brightness yellow region, which show little variation in coloring due to variation in the discharge weight even when the ink is discharged by the ink jet method, and which show no conspicuous graininess due to dot expression.

Furthermore, the present invention also provides a recording system for forming images using the abovementioned yellow ink composition. By using this recording system, it is possible to obtain good-quality recorded images which are superior in terms of color reproducibility in the high-brightness yellow region, which show little variation in coloring due to variation in the discharge weight even when the ink is discharged by the ink jet method, and which show no conspicuous graininess due to dot expression.

Furthermore, the present invention also provides recorded matter in which images are formed using the abovementioned yellow ink composition. This recorded matter is good-quality recorded matter which is superior in terms of color reproducibility in the high-brightness yellow region, which shows little variation in coloring due to variation in the discharge weight even when the ink is discharged by the ink jet method, and which shows no conspicuous graininess due to dot expression.

Furthermore, as a result of diligent research, the present inventors discovered that an ink set equipped with a yellow ink containing a metal complex pigment is superior in terms of color reproducibility not only in the high-brightness region, but also in the region of "low L*, a* close to zero, and high b*".

The present invention was devised on the basis of the abovementioned findings; this invention provides an ink set that includes a yellow ink in which the Y value is 86 or greater when the Z value in the XYZ display system stipulated by the CIE is 23, as calculated from the ultraviolet-visible transmission spectrum of an aqueous solution diluted to at least 10,000 times by weight or lower.

Since the ink set of the present invention consists of the abovementioned construction, low-brightness yellow can also be expressed with good reproducibility even if only a single type of yellow ink is used. Furthermore, this ink set is also superior in terms of color reproducibility in both the red region and green region.

Furthermore, the present invention also provides a recording method for forming images using the abovementioned ink set. If this recording method is used, it is possible to obtain good-quality recorded images that are superior in terms of color reproducibility in the low-brightness yellow region, and also in the red region and green region.

Furthermore, the present invention also provides a recording system for forming images using the abovementioned ink set. If this recording system is used, it is possible to obtain good-quality recorded images which show no conspicuous graininess due to dot expression, and which are superior in terms of color reproducibility in the low-brightness yellow region, and also in the red region and green region.

Furthermore, the present invention also provides recorded matter in which images are formed using the abovementioned ink set. This recorded matter is good-quality recorded matter which is superior in terms of color reproducibility in the low-brightness yellow region, and also in the red region and green region, and which shows no conspicuous graininess due to dot expression.

DESCRIPTION OF DRAWINGS

FIG. 3 shows the evaluation results for color reproducibility in the low-L* high-b* region according to the ink set of the present invention;

FIG. 4 shows the evaluation results for color reproducibility in the low-L* high-b* region according to the ink set of the present invention;

DETAILED DESCRIPTION (Yellow Ink Composition)

Figure 1:
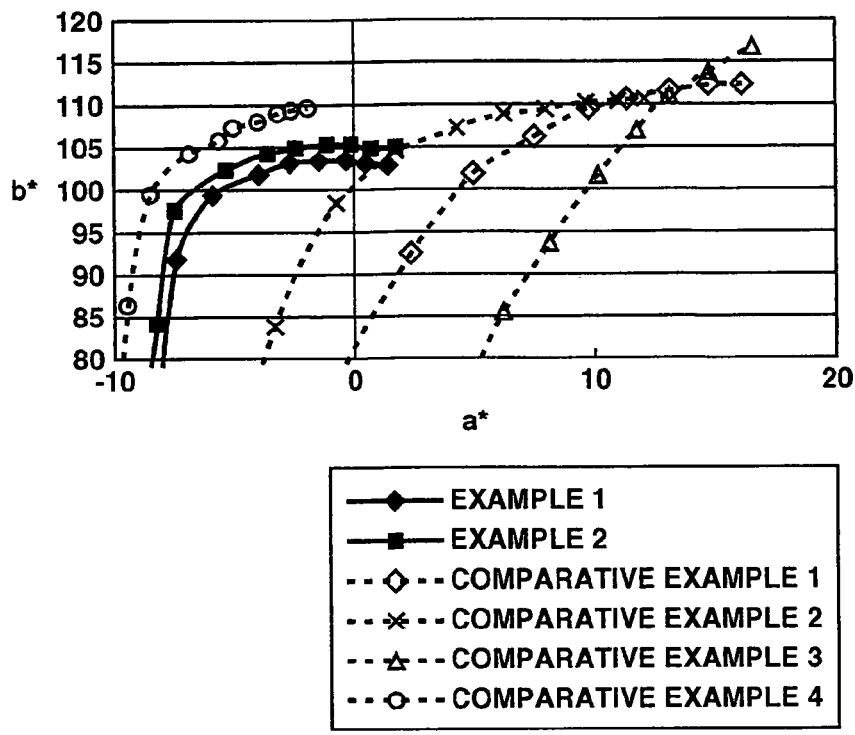
FIG. 1 shows the relationship between the a* value and b* value in the embodiments and comparative examples.

The yellow ink composition of the present invention will be described below on the basis of preferred embodiments.

The yellow ink composition of the present invention has a Y value of 86 or greater when the Z value in the XYZ display system stipulated by the CIE is 23. The Z value can be calculated from the ultraviolet-visible transmission spectrum of a dilute aqueous solution of the ink composition. When the pigment concentration of the ink composition varies, the dilution rate required in order to obtain a Z value of 23 also fluctuates; however, as long as the Y value of a given ink is 86 or greater when this ink is diluted so that the Z value is 23, this ink is included in the ink composition of the present invention. Here, for example, the Z value can be obtained by measuring the transmissivity using a U3300 (manufactured by Hitachi Seisakusho K.K.) at a scanning speed of 600 nm/min, a measurement wavelength range of 380 to 800 nm, and a slit width of 2.0 nm, and calculating the Z value at a visual field angle of 2 degrees in the case of a D65 light source.

The yellow ink of the present invention has a Y value of 86 or greater when the Z value in the XYZ display system stipulated by the CIE is 23, preferably in a dilution range of 100 times to 3,000 times by weight, more preferably in a dilution range of 500 times to 2,500 times by weight, and even more preferably in a dilution range of 1,000 times to 2,000 times by weight.

As was described above, it is desirable that the yellow ink composition of the present invention contain a metal complex pigment. For instance, C. I. pigment yellow 129 (hereafter abbreviated to "PY 129" in some cases), C. I. pigment yellow 117 and the like may be cited as examples of such metal complex pigments. PY 129 is especially suitable for use. Furthermore, for instance, complex pigments containing copper, aluminum, zinc or the like may also be cited as examples of metal complex pigments; here, copper pigments are especially desirable. Yellow inks containing metal complex pigments can express the high-brightness yellow region with good reproducibility. Furthermore, by using an ink containing a metal complex pigment, it is possible to form an ink set that is also superior in terms of image fastness.

Furthermore, it is desirable that the yellow ink composition of the present invention contain at least one other yellow pigment selected from a set consisting of PY 74, 93, 109, 110, 128, 138, 150, 151, 154, 155, 180 and 185 in addition to a metal complex pigment. By mixing these yellow pigments which have a relatively high brightness, it is possible to obtain an ink composition which is superior in terms of yellow stability and reproducibility over a broad range ranging from the high-brightness region to the low-brightness region. As a result, even in cases where the ink is discharged in dot form by an ink jet method, a result of inconspicuous graininess can be obtained. Moreover, in such a construction, the reproducibility of low brightness values and high brightness values in the can be improved with a good balance even if a plurality of different types of yellow inks are not used. In order to obtain such an effect, PY 74 is especially suitable for use among the abovementioned yellow pigments.

Furthermore, in the yellow ink composition of the present invention, the abovementioned metal complex pigment is preferably contained at the rate of 10 wt % to 90 wt % of the total pigment solid content, or more preferably at the rate of 10 wt % to 60 wt %. In the case of inks with a deep color (e.g., inks in which the total pigment solid content is contained at the rate of approximately 4 wt % relative to the ink weight), it is desirable that the metal complex pigment be contained at the rate of approximately 10 wt % to 30 wt % of the total pigment solid content, while in the case of inks with a light color (e.g., inks in which the total pigment solid content is contained at the rate of approximately 2 wt % relative to the ink weight), it is desirable that the metal complex pigment be contained at the rate of approximately 30% to 60% of the total pigment solid content. In particular, it is especially desirable to use PY 129 oafs the metal complex pigment, to use PY 74 as the other yellow pigment, and to mix these pigments at the abovementioned weight ratio. In this case, color reproducibility with a better balance can be obtained in a broad range ranging from high brightness values to low brightness values.

Along with using a pigment as a coloring material, it is desirable that the yellow ink composition of the present invention contain a dispersing agent that is used to disperse this pigment. Dispersing agents similar to those commonly used in pigment inks of this type can be used as dispersing agents without any particular restrictions. For example, cationic dispersing agents, anionic dispersing agents, non-ionic dispersing agents and surfactants and the like can be used. Examples of anionic dispersing agents include polyacrylic acids, polymethacrylic acids, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl-ethylene copolymers, vinyl acetate-maleic acid ester copolymers, vinyl acetate-crotonic acid copolymers, vinyl acetate-acrylic acid copolymers and the like. Furthermore, examples of anionic surfactants include sodium dodecylbenzenesulfonate, sodium laurate, ammonium salts of polyoxyethylene alkyl ethers and the like. Examples of nonionic surfactants include polyoxyethylene alkyl ethers, polyoxyethylene alkyl esters, polyoxyethylene sorbitan fatty acid esters, polyoxyethylene alklphenyl ethers, polyoxyethylene alkylamines, polyoxyethylene alkylamides and the like. One of these compounds, or two or more of these compounds, may be used. In particular, the use of styrene-(meth)acrylic acid copolymers is especially desirable from the standpoint of increasing the dispersion stability of the pigment.

The abovementioned dispersing agent is ordinarily contained in each of the abovementioned inks at the rate of 140 wt % or less (calculated as solid content) with reference to the weight of the abovementioned pigment.

The abovementioned dispersing agent is preferably contained at the rate of 10 to 140 wt % (calculated as solid content), more preferably contained at the rate of 10 to 100 wt %, and even more preferably contained at the rate of 10 to 40 wt %, with reference to the weight of the abovementioned pigment. Furthermore, the content of the dispersing agent with respect to the amount of ink (calculated as solid content) is preferably 0.1 to 10 wt %, and is even more preferably 0.3 to 3 wt %.

Furthermore, in cases where the yellow ink composition of the present invention is ued in ink jet recording, it is desirable from the standpoint of preventing clogging of the ink jet printer head by preventing drying of the ink that the yellow ink composition contain a high-boiling-point organic solvent. Examples of such high-boiling-point organic solvents include polyhydric alcohols such as ethylene glycol, diethylene glycol, triethylene glycol, polyethylene glycols, polypropylene glycols, propylene glycol, butylene glycol, 1,2,6-hexanetriol, thioglycol, hexylene glycol, glycerol, trimethylolethane, trimethylolpropane and the like; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and the like; organic alkalies such as urea, 2-pyrrolidoine, N-methyl-2-pyrrolidone, 1,3-dimethyl-2-imidazolidinone, triethanolamine and the like; and sugars such as sugar alcohols and the like. One of these compounds, or two or more of these compounds, may be used. In particular, in order to improve the prevention of clogging, and in order to stabilize the dispersibility of the coloring material and improve the luster of the recorded images, it is desirable to add an organic alkali such as triethanolamine or the like along with glycerol.

The abovementioned high-boiling-point organic solvent is contained is preferably contained in the ink at the rate of 0.1 to 30 wt %, and is even more preferably contained in the ink at the rate of 0.5 to 25 wt %.

Furthermore, among this high-boiling-point organic solvents, triethanolamine functions as a pH adjusting agent and a dispersion stabilizing agent; from the standpoint of manifesting these functions, it is desirable that such triethanolamine be contained in the respective inks at the rate of 0.1 to 10 wt %.

Furthermore, from the standpoint of increasing wettability on the recording medium and heightening the permeability of the ink, the yellow ink composition of the present invention may contain a permeation accelerating agent. For instance, examples of permeation accelerating agents include alcohols such as methanol, ethanol, isopropyl alcohol and the like, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, dipropylene glycol monobutyl ether and the like; and diols such as 1,2-pentanediol, 1,2-hexanediol and the like. One of these compounds may be used, or two or more of these compounds may be used. In particular, it is especially desirable to use diethylene glycol monobutyl ether, triethylene glycol monobutyl ether or 1,2-hexanediol, or to use two or more of these compounds.

The abovementioned permeation accelerating agent is preferably contained in the abovementioned ink at the rate of 1 to 20 wt %, and is even more preferably contained in the abovementioned ink at the rate of 1 to 10 wt %.

Furthermore, the yellow ink composition of the present invention may use various types of surfactants such as anionic surfactants, nonionic surfactants, cationic surfactants, amphoteric surfactants and the liked from the standpoint of heightening the wettability on the recording medium and increasing the permeability of the ink as in the case of the abovementioned permeation accelerating agent; in particular, it is especially desirable to use acetylene glycol type compounds or silicone type compounds. Commercially marketed compounds can be used as the abovementioned acetylene glycol type compounds; examples of such compounds include Olefin Y, Surfinol 82, 440, 465, 485 (these are all commercial names of products manufactured by Air Products and Chemicals Co.), Olefin STG, Olefin E1010 (these are all commercial names of products manufactured by Nisshin Kagaku K.K.) and the like. One of these compounds may be used, or two or more of these compounds may be used. In particular, it is especially desirable to use Olefin E1010 or Surfinol 465. Furthermore, examples of the abovementioned silicone type compounds that can be used include polysiloxane type compounds such as BYK 347 or 348, BYKUV 3510 (manufactured by Byk Chemie Japan) or the like. The abovementioned acetylene glycol type compounds and/or silicone type compounds are preferably contained in the abovementioned ink at the rate of 0.01 to 5 wt %, more preferably at the rate of 0.1 to 1.0 wt %, and most preferably at the rate of 0.1 to 0.5 wt %.

Furthermore, from the standpoint of shortening the ink drying time, the yellow ink composition of the present invention may contain a low-boiling-point organic solvent. Examples of such solvents include methanol, ethanol, n-propyl alcohol, isopropyl alcohol, n-butanol, sec-butanol, tert-butanol, isobutanol, n-pentanol and the like. One of these solvents may be used, or two ore more of these solvents may be used. In particular, monohydric alcohols are especially desirable.

The yellow ink composition of the present invention contains the abovementioned components such as a pigment, dispersing agent, high-boiling-point organic solvent, permeation accelerating agent, acetylene glycol type compound and/or silicone type compound and the like, and ordinarily contains water as the balance. It is desirable to use pure water or ultra-pure water such as ion exchange water, ultra-filtered water, reverse-osmosis water, distilled water or the like as the abovementioned water. In particular, water obtained by disinfecting water of such types by ultraviolet irradiation, addition of hydrogen peroxide or the like can prevent the generation of molds or bacteria over a long period of time, and is therefore desirable.

If necessary, additives, e.g., fixing agents such as water-soluble rosins or the like, anti-mold agents or preservatives such as sodium benzoate or the like, anti-oxidation agents or ultraviolet absorbing agents such as allophanates or the like, chelating agents, oxygen absorbing agents, pH adjusting agents and the like can be added to the yellow ink composition of the present invention. One of these additives may be used, or two or more of these additives may be used.

The yellow ink composition of the present invention can be prepared in the same manner as conventional pigment inks using a conventional universally known apparatus such as a ball mill, sand mill, attriter, basket mill, roll mill or the like. In this manufacture, it is desirable that coarse particles be removed using a membrane filter, mesh filter or the like.

There are no particular restrictions on the applications in which the yellow ink composition of the present invention can be used; however, it is desirable that this yellow ink composition be used in an ink jet recording method which is a recording method for forming images such as characters, figures and the like by discharging ink droplets from a nozzle, and causing these ink droplets to adhere to a recording medium, and it is especially desirable that this yellow ink composition be used in an on-demand type ink jet recording method. For instance, examples of on-demand type ink jet recording methods include piezo-electric element recording methods in which recording is performed using a piezoelectric element disposed in a recording head, thermal jet recording methods in which recording is performed using thermal energy generated by means of a heater consisting of a heat generating resistance element or the like disposed in a recording head, or the like. The yellow ink composition of the present invention can be used in any of these ink jet recording methods.

The yellow ink composition of the present invention can be applied without any restrictions to recording media ordinarily used as recording media for forming images in ink jet recording methods or the like. Preferably, however, this yellow ink composition is used on media that have a coating layer or on ordinary paper (recording media in which fibers are exposed at the surface on which recording is performed) or the like. In particular, if the yellow ink composition of the present invention is used on a recording medium that has a coating layer, a marked effect in suppressing the graininess caused by dot expression at the time of image formation can be obtained.

In the present specification, the term "medium having a coating layer" refers to all media in which the surface on which images are formed using the abovementioned yellow ink composition (i.e., the recording surface) is covered by at least a coating layer. Such media having a coating layer are ordinarily media with an 85-degree luster of 120 or less. Here, the 85-degree luster is measured using a "PG1M" manufactured by Nippon Denshoku Kogyo K.K. or the like. Furthermore, during measurement, the measuring apparatus is adjusted beforehand so that the 85-degree luster of the reference luster plate shows a value of 100.

Examples of media having a coating layer include mirror surface media with an 85-degree luster of 70 to 120, e.g., media having a resin coating layer which is such that the outline of the copied image of a fluorescent lamp can be confirmed visually when the medium is illuminated by this fluorescent lamp from a distance of 1 m or greater. A typical example is "PGPP (Premium Glossy Photo Paper)" manufactured by Seiko-Epson K.K., which has an 85-degree luster of 81.

Furthermore, other examples of media having a coating layer include semi-glossy media with an 85-degree luster of 10 to 70, matte media with an 85-degree luster of 10 or less, and the like.

Furthermore, even in the case of recording at a low resolution on a relatively small size medium such as an L size or the like (preferably a medium which has a coating layer), the yellow ink composition of the present invention can achieve an extreme suppression of graininess caused by dot expression. Accordingly, the yellow ink composition of the present invention is especially effective on relatively small size media such as L size or the like.

(Ink Set)

The ink set of the present invention will be described below on the basis of preferred embodiments.

As was described above, the yellow ink composition of the present invention contains a yellow ink in which the Y value is 86 or greater when the Z value in the XYZ display system stipulated by the CIE is 23, as calculated from the ultraviolet-visible transmission spectrum of an aqueous solution diluted to 10,000 times by weight or lower (e.g., at a visual field angle of 2 degrees with a D65 light source). Here, it is sufficient if the Y value of this yellow ink is 86 or greater when the Z value in the XYZ display system stipulated by the CIE is 23 in a case where the yellow ink is diluted at a rate of 10,000 times or less by weight. For example, the yellow ink included in the ink set of the present invention has a Y value of 86 or greater when the Z value in the XYZ display system stipulated by the CIE is 23, preferably in a dilution range of approximately 100 times to approximately 3,000 times by weight, more preferably in a dilution range of approximately 500 times to approximately 2,500 times by weight, and even more preferably in a dilution range of approximately 1,000 times to approximately 2,000 times by weight.

Furthermore, the ink set of the present invention preferably includes a yellow ink which has a Y value of 87 or greater when the Z value in the XYZ display system stipulated by the CIE is 23, and even more preferably include a yellow ink which has a Y value of 88 or greater when the Z value in the XYZ display system stipulated by the CIE is 23.

Here, for example, the Z value can be obtained by measuring the transmissivity using a U3300 (manufactured by Hitachi Seisakusho K.K.) at a scanning speed of 600 nm/min, a measurement wavelength range of 80 to 800 nm, and a slit width of 2.0 nm, and calculating the Z value at a visual field angle of 2 degrees in the case of a D65 light source (the same is true of other inks below).

It is desirable that the yellow ink in the ink set of the present invention contain a metal complex pigment. For instance, C. I. pigment yellow 129 (hereafter abbreviated to "PY 129" in some cases), C. I. pigment yellow 117 and the like may be cited as examples of such metal complex pigments. PY 129 is especially suitable for use. Furthermore, for instance, complex pigments containing copper, aluminum, zinc or the like may also be cited as examples of metal complex pigments; here, copper pigments are especially desirable. Yellow inks containing metal complex pigments can express the high-brightness yellow region with good reproducibility. Furthermore, by using an ink containing a metal complex pigment, it is possible to form an ink set that is also superior in terms of image fastness.

Furthermore, in the yellow ink included in the ink set of the present invention, the abovementioned metal complex pigment is preferably contained at the rate of 10 wt % to 90 wt % of the total pigment solid content, more preferably at the rate of 10 wt % to 60 wt %. In the case of inks with a deep color (e.g., inks in which the total pigment solid content is contained at the rate of approximately 4 wt % relative to the ink weight), it is desirable that the metal complex pigment be contained at the rate of approximately 10 wt % to 30 wt % of the total pigment solid content, while in the case of inks with a light color (e.g., inks in which the total pigment solid content is contained at the rate of approximately 2 wt % relative to the ink weight), it is desirable that the metal complex pigment be contained at the rate of approximately 30% to 60% of the total pigment solid content. In particular, it is especially desirable to use PY 129 as the metal complex pigment, to use PY 74 as the other yellow pigment, and to mix these pigments at the abovementioned weight ratio. In this case, color reproducibility with a better balance can be obtained in a broad range ranging from high brightness values to low brightness values.

Furthermore, it is desirable that the yellow ink included in the ink set of the present invention contain at least one other yellow pigment selected from a set consisting of PY 74, 93, 109, 110, 128, 138, 150, 151, 154, 155, 180 and 185 in addition to a metal complex pigment. By mixing these yellow pigments which have a relatively high brightness, it is possible to improve the color reproducibility in the high-brightness region of yellow, and an effect that makes graininess inconspicuous can also be obtained. Moreover, as a result, the reproducibility of low brightness values and high brightness values in the yellow region can be improved with a good balance even if a plurality of different types of yellow inks are not used. In order to obtain such an effect, PY 74 is especially suitable for use among the abovementioned yellow pigments.

Furthermore, it is desirable that the ink set of the present invention comprise a magenta ink (M) and a cyan ink (C) in addition to the abovementioned yellow ink (Y). Such YMC inks are superior in terms of color reproducibility in a broad yellow region ranging from high brightness values to low brightness values. Furthermore, such inks are also superior in terms of color reproducibility in the red region and green region, and graininess in the case of dot expression is likewise not a problem.

Furthermore, in addition to the abovementioned YMC inks, the ink set of the present invention may also comprise black inks such as photo-black inks (PK) and/or matte black inks (MK) and the like. As a result, in addition to the above effects, an ink set with good black coloring can also be obtained. Furthermore, since black is generally used more often than other colors, if such black inks are provided separately from the YMC inks, then these black inks alone can be replenished, which is convenient.

From the standpoint of superior image fastness of the recorded matter and the like, pigments are desirable as the the coloring materials (coloring agents) of the respective inks in the ink set of the present invention. Inorganic pigments or organic pigments can be used as these pigments; such pigments can be used singly or in mixtures consisting of a plurality of pigments. For example, besides titanium oxide and iron oxide, carbon black and the like manufactured by universally known methods such as the contact method, furnace method, thermal method or the like can be used as the abovementioned inorganic pigments. Furthermore, azo pigments (including azo lake pigments, insoluble azo pigments, condensed azo pigments, chelate azo pigments and the like), polycyclic pigments (e.g., phthalocyanine pigments, perylene pigments, perinone pigments, anthraquinone pigments, quinacridone pigments, dioxazine pigments, thioindigo pigments, isoindolinone pigments, quinofuralone pigments and the like), dye chelates (e.g., basic dye chelates, acid dye chelates and the like), nitro pigments, nitroso pigments, aniline black and the like can be used as the abovementioned organic pigments.

In regard to inks of respective colors other than yellow, in concrete terms, various types of pigments can be used as described below.

There are no particular restrictions on magenta ink pigments that can be used, as long as the resulting magenta ink has the specified Z value and specified L* value. For instance, examples of pigments that can be used include C. I. pigment red 5, 7, 12, 48 (Ca), 48 (Mn), 57 (Ca), 57:1, 112, 122, 123, 168, 184, 202, 207 and 209, C. I. pigment violet 19 and the like, which can be used singly or in combinations consisting of two or more pigments. In particular, C. I. pigment violet 19 and C. I. pigment red 122 are especially desirable, since these pigments make it possible to obtain high-quality images in which metamerism and graininess are greatly reduced.

There are no particular restrictions on cyan ink pigments that can be used, as long as the resulting cyan ink has the specified L* value. For instance, examples of pigments that can be used include C. I. pigment blue 1, 2, 3, 15:3, 15:4, 15:34, 16, 22 and 60, C. I. vat blue 4 and 60 and the like, which can be used singly or in combinations consisting of two or more pigments. In particular, C. I. pigment blue 15:3 is especially desirable.

In particular, in cases where the ink set of the present invention is a combination of YMC inks in which the pigment of the magenta ink is C. I. pigment violet 19 or C. I. pigment red 122, the pigments of the yellow ink are PY 129 and PY 74, and the pigment of the cyan ink is C. I. pigment blue 15:3, recorded images that show a much smoother visible absorption spectrum can be obtained when printing is performed. Accordingly, such a combination of inks is desirable.

Examples of black inks that can be used in the present invention include inks containing inorganic pigments, e.g., various types of carbon black (C. I. pigment black 7) such as furnace black, lamp black, acetylene black, channel black or the like, iron oxide pigments or the like, and inks containing organic pigments such as aniline black (C. I. pigment black 1) or the like. Among these pigments, carbon black is especially desirable for use. Desirable examples of carbon black include No. 2300, No. 900, MCF88, No. 33, No. 40, No. 52, MA7, MA8, MA100, No. 2200B and the like manufactured by Mitsubishi Kagaku, Raven5750, Raven5250, Raven5000, Raven 3500, Raven 1255, Raven700 and the like manufactured by Columbia Co., Regal 400R, Regal 1660R, Mogul 1, Monarch 700, Monarch 800, Monarch 880, Monarch 900, Monarch 1000, Monarch 1100, Monarch 1300, Monarch 1400 and the like manufactured by Cabot Co., and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and the like manufactured by Degussa Co. The content of the pigment in the black ink is preferably 0.1 to 10.0 wt %, and is even more preferably 1.0 to 8.0 wt %.

Furthermore, for example, besides the abovementioned inks, the ink set of the present invention may also comprise one or more other inks such as transparent inks, white inks or the like.

It is desirable that the respective inks of the ink set of the present invention use pigments as coloring materials, and that these inks contain dispersing agents used to disperse these pigments. Dispersing agents similar to those used in pigment inks of this type can be used without any particular restrictions as dispersing agents in this case. For instance, cationic dispersing agents, anionic dispersing agents, non-ionic dispersing agents and surfactants and the like can be cited as examples. Examples of anionic dispersing agents include polyacrylic acids, polymethacrylic acids, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinylethylene copolymers, vinyl acetate-maleic acid ester copolymers, vinyl acetate-crotonic acid copolymers, vinyl acetate-acrylic acid copolymers and the like. Furthermore, example of anionic surfactants include sodium dodecylbenzenesulfonate, sodium laurate, ammonium salts of polyoxyethylene alkyl ethers sulfate and the like. Examples of nonionic surfactants include polyoxyethylene alkyl ethers, polyoxyethylene alkyl esters, polyoxyethylene sorbitan fatty acid esters, polyoxyethylene alklphenyl ethers, polyoxyethylene alkylamines, polyoxyethylene alkylamides and the like. One of these compounds, or two or more of these compounds, may be used. In particular, the use of styrene-(meth)acrylic acid copolymers is especially desirable from the standpoint of increasing the dispersion stability of the pigment.

The abovementioned dispersing agent is ordinarily contained in each of the abovementioned inks at the rate of 140 wt % or less (calculated as solid content) with reference to the weight of the abovementioned pigment.

In particular, in the magenta ink, yellow ink and cyan ink, the abovementioned dispersing agent is preferably contained at the rate of 10 to 140 wt % (calculated as solid content), more preferably contained at the rate of 10 to 100 wt %, and even more preferably contained at the rate of 10 to 40 wt %, with reference to the weight of the abovementioned pigment.

Furthermore, the content of the dispersing agent with respect to the amount of each ink (calculated as solid content) is preferably 0.1 to 10 wt %, and is even more preferably 0.3 to 3 wt %.

Furthermore, in cases where the respective inks of the ink set of the present invention are used in ink jet recording, it is desirable from the standpoint of preventing clogging of the ink jet printer head by preventing drying of the ink that the inks contain a high-boiling-point organic solvent. Examples of such high-boiling-point organic solvents include polyhydric alcohols such as ethylene glycol, diethylene glycol, triethylene glycol, polyethylene glycols, polypropylene glycols, propylene glycol, butylene glycol, 1,2,6-hexanetriol, thioglycol, hexylene glycol, glycerol, trimethylolethane, trimethylolpropane and the like; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and the like; organic alkalies such as urea, 2-pyrrolidoine, N-methyl-2-pyrrolidone, 1,3-dimethyl-2-imidazolidinone, triethanolamine and the like; and sugars such as sugar alcohols and the like. One of these compounds, or two or more of these compounds, may be used. In particular, in order to improve the prevention of clogging, and in order to stabilize the dispersibility of the coloring material and improve the luster of the recorded images, it is desirable to add an organic alkali such as triethanolamine or the like along with glycerol.

The abovementioned high-boiling-point organic solvent is preferably contained in each of the abovementioned inks at the rate of 0.1 to 30 wt %, and is even more preferably contained in each of the abovementioned inks at the rate of 0.5 to 25 wt %.

Furthermore, among these high-boiling-point organic solvents, triethanolamine functions as a pH adjusting agent and a dispersion stabilizing agent; from the standpoint of manifesting these functions, it is desirable that such triethanolamine be contained in the respective inks at the rate of 0.1 to 10 wt %.

Furthermore, from the standpoint of increasing wettability on the recording medium and heightening the permeability of the ink, the respective inks of the ink set of the present invention may contain a permeation accelerating agent. For instance, examples of permeation accelerating agents include alcohols such as methanol, ethanol, isopropyl alcohol and the like, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, dipropylene glycol monobutyl ether and the like; and diols such as 1,2-pentanediol, 1,2-hexanediol and the like. One of these compounds may be used, or two or more of these compounds may be used. In particular, it is especially desirable to use diethylene glycol monobutyl ether, triethylene glycol monobutyl ether or 1,2-hexanediol, or to use two or more of these compounds.

The abovementioned permeation accelerating agent is preferably contained in the abovementioned inks at the rate of 1 to 20 wt %, and is even more preferably contained in the abovementioned ink at the rate of 1 to 10 wt %.

Furthermore, the respective inks of the ink set of the present invention may use various types of surfactants such as anionic surfactants, nonionic surfactants, cationic surfactants, amphoteric surfactants and the like from the standpoint of heightening the wettability on the recording medium and increasing the permeability of the ink as in the case of the abovementioned permeation accelerating agent; in particular, it is especially desirable to use acetylene glycol type compounds or silicone type compounds. Commercially marketed compounds can be used as the abovementioned acetylene glycol type compounds; examples of such compounds include Olefin Y, Surfinol 82, 440, 465, 485 (these are all commercial names of products manufactured by Air Products and Chemicals Co.), Olefin STG, Olefin E1010 (these are all commercial names of products manufactured by Nisshin Kagaku K.K.) and the like. One of these compounds may be used, or two or more of these compounds may be used. In particular, it is especially desirable to use Olefin E1010 or Surfinol 465. Furthermore, examples of the abovementioned silicone type compounds that can be used include polysiloxane type compounds such as BYK 347 or 348, BYKUV 3510 (manufactured by Byk Chemie Japan) or the like. The abovementioned acetylene glycol type compounds and/or silicone type compounds are preferably contained in the abovementioned inks at the rate of 0.01 to 5 wt %, more preferably at the rate of 0.1 to 1.0 wt %, and most preferably at the rate of 0.1 to 0.5 wt %.

Furthermore, from the standpoint of shortening the ink drying time, the respective inks of the ink set of the present invention may contain a low-boiling-point organic solvent. Examples of such solvents include methanol, ethanol, n-propyl alcohol, isopropyl alcohol, n-butanol, sec-butanol, tert-butanol, isobutanol, n-pentanol and the like. One of these solvents may be used, or two ore more of these solvents may be used. In particular, monohydric alcohols are especially desirable.

The respective inks of the ink set of the present invention contain the abovementioned components such as a pigment, dispersing agent, high-boiling-point organic solvent, permeation accelerating agent, acetylene glycol type compound and/or silicone type compound and the like, and ordinarily contain water as the balance. It is desirable to use pure water or ultra-pure water such as ion exchange water, ultra-filtered water, reverse-osmosis water, distilled water or the like as the abovementioned water. In particular, water obtained by disinfecting water of such types by ultraviolet irradiation, addition of hydrogen peroxide or the like can prevent the generation of molds or bacteria over a long period of time, and is therefore desirable.

If necessary, additives, e.g., fixing agents such as water-soluble rosins or the like, anti-mold agents or preservatives such as sodium benzoate or the like, anti-oxidation agents or ultraviolet absorbing agents such as allophanates or the like, chelating agents, oxygen absorbing agents, pH adjusting agents and the like can be added to the respective inks of the ink set of the present invention. One of these additives may be used, or two or more of these additives may be used.

The respective inks of the ink set of the present invention can be prepared in the same manner as conventional pigment inks using a conventional universally known apparatus such as a ball mill, sand mill, attriter, basket mill, roll mill or the like. In this manufacture, it is desirable that coarse particles be removed using a membrane filter, mesh filter or the like.

There are no particular restrictions on the applications in which the ink set of the present invention can be used; however, it is desirable that this ink set be used in an ink jet recording method which is a recording method for forming images such as characters, figures and the like by discharging ink droplets from a nozzle, and causing these ink droplets to adhere to a recording medium, and it is especially desirable that this yellow ink composition be used in an on-demand type ink jet recording method. For instance, examples of on-demand type ink jet recording methods include piezo-electric element recording methods in which recording is performed using a piezo-electric element disposed in a recording head, thermal jet recording methods in which recording is performed using thermal energy generated by means of a heater consisting of a heat generating resistance element or the like disposed in a printer head, or the like. The yellow ink composition of the present invention can be used in any of these ink jet recording methods.

Furthermore, in cases where the ink set of the present invention is used in an ink jet recording method as described above, the reliability of this ink set as an ink set for use in ink jet recording is high, and in particular, if the respective inks in the ink set are set at pigment concentrations which are such that there is no clogging of the nozzles of the ink jet printer, the reliability of the ink set as an ink set for use in ink jet recording is increased even further in spite of the fact that the color reproducibility has a broad range.

The ink set of the present invention can be applied without any restrictions to recording media that are ordinarily used in ink jet recording methods and the like as recording media for forming images. Preferably, however, this ink set is used on media that have a coating layer or on ordinary paper (recording media in which fibers are exposed at the surface on which recording is performed) or the like. In particular, if the ink set of the present invention is used on a recording medium that has a coating layer, a marked effect in suppressing the graininess caused by dot expression at the time of image formation can be obtained.

In the present specification, the term "medium having a coating layer" refers to all media in which the surface on which images are formed using the abovementioned yellow ink composition (i.e., the recording surface) is covered by at least a coating layer. Such media having a coating layer are ordinarily media with an 85-degree luster of 120 or less. Here, the 85-degree luster is measured using a "PG1M" manufactured by Nippon Denshoku Kogyo K.K. or the like. Furthermore, during measurement, the measuring apparatus is adjusted beforehand so that the 85-degree luster of the reference luster plate shows a value of 100.

Examples of media having a coating layer include mirror surface media with an 85-degree luster of 70 to 120, e.g., media having a resin coating layer which is such that the outline of the copied image of a fluorescent lamp can be confirmed visually when the medium is illuminated by this fluorescent lamp from a distance of 1 m or greater. A typical example is "PGPP (Premium Glossy Photo Paper)" manufactured by Seiko-Epson K.K., which has an 85-degree luster of 81.

Furthermore, other examples of media having a coating layer include semi-glossy media with an 85-degree luster of 10 to 70, matte media with an 85-degree luster of 10 or less, and the like.

Furthermore, even in the case of recording at a low resolution on a relatively small size medium such as an L size or the like (preferably a medium which has a coating layer), the ink set of the present invention can achieve an extreme suppression of graininess caused by dot expression. Accordingly, the ink set of the present invention is especially effective on relatively small size media such as L size or the like.

(Recording Method)

Next, the recording method of the present invention will be described.

The present invention is a recording method for forming images using the abovementioned yellow ink composition, i.e., a method for forming images using a yellow ink composition in which the Y value is 86 or greater when the Z value in the XYZ display system stipulated by the CIE is 23, as calculated from the ultraviolet-visible transmission spectrum of an aqueous solution diluted at least approximately 2000 times by weight; in particular, a recording method using the yellow ink composition of the abovementioned embodiment is ideal. Furthermore, the recording method of the present invention can be worked in the same manner ordinary ink jet recording methods or the like except for the fact tha the abovementioned yellow ink composition is used.

In the ink jet recording method of the present invention, images with a greatly improved color reproducibility can be obtained at both a high brightness and a low brightness in the yellow region. Accordingly, even if there is some variation in the amount of discharge caused by the temperature during recording, differences between individual devices, ink viscosity, ink supply force and the like, images can be obtained in which such variation has little effect on the color reproducibility.

In the recording method of the present invention, it is desirable to form images so that the ink weight at a duty of 100% is 7 to 13 mg/inch$^2$.

Furthermore, in regard to mixed colors, it is desirable to form images so that the ink weight at a duty of 120% is 8 to 16 mg/inch$^2$.

Furthermore, in the present specification, the "duty" is defined by the following equation, and indicates the units of the calculated value D.

D=(actual number of printed dots/(vertical resolution× horizontal resolution))×100. Furthermore, a duty of 100% indicates the maximum ink weight per pixel.

The present invention is a recording method for forming images using the abovementioned ink set, i.e., a method for forming images using an ink set which includes a yellow ink (Y) in which the Y value is 87 or greater when the Z value in the XYZ display system stipulated by the CIE is 23, as calculated from the ultraviolet-visible spectrum of an aqueous solution diluted at least 10,000 times by weight or lower. In particular, a recording method using the ink set of the abovementioned embodiment is ideal. Furthermore, the recording method of the present invention is performed in the same manner as an ordinary ink jet recording method or the like, except for the fact that the abovementioned ink set is used.

In particular, in regard to the recording method of the present invention, an ink jet recording method is ideally provided which forms images by means of an ink corresponding to single color (monochromatic images) in cases where droplets of the abovementioned inks of a plurality of colors are discharged and a single color is formed on a recording medium, and which forms mixed color portions by means of at least two of the inks contained in the ink set in cases where such mixed color portions consisting of two or more secondary colors (colors that cannot be formed by the respective individual inks alone) are formed.

In the ink jet recording method of the present invention, images with greatly improved color reproducibility can be obtained at high brightness values and low brightness values in the yellow region; furthermore, images that are superior in terms of color reproducibility can also be obtained in the red region and green region. In addition, an ink jet recording method which forms such mixed color portions by means of black inks (PK and/or MK) can also be provided.

In the recording method of the present invention, it is desirable to form images so that the ink weight at a duty of 100% is 7 to 13 mg/inch$^2$.

Furthermore, in the case of mixed colors, it is desirable to form images so that the ink weight at a duty of 120% is 8 to 16 mg/inch$^2$.

Moreover, in the present specification, "duty" is defined by the following equation, and indicates the units of the calculated value D.

D=(actual number of printed dots/(vertical resolution× horizontal resolution))×100. Furthermore, a duty of 100% indicates the maximum ink weight per pixel.

(Recording System)

The present invention is a recording system for forming images using the abovementioned yellow ink composition; in particular, a recording apparatus or other recording system such as an ink jet printer or the like which uses the yellow ink composition of the abovementioned embodiment is ideal.

Furthermore, the present invention is a recording system for forming images using the abovementioned ink set; in particular, a recording apparatus or other recording system such as an ink jet printer or the like which uses the ink set of the abovementioned embodiment is ideal.

(Recorded Matter)

The present invention is recorded matter in which images are formed using the abovementioned yellow ink composition; in particular, recorded matter using the yellow ink composition of the abovementioned embodiment is ideal.

Furthermore, the present invention is recorded matter in which images are formed using the abovementioned ink set; in particular, recorded matter using the ink set of the abovementioned embodiment is ideal.

(Modifications)

The present invention ideally provides the respective embodiments described above. However, the present invention is not limited to these embodiments; various modifications may be made without departing from the spirit of the present invention.

Below, the present invention will be described more concretely in terms of examples and test examples; however, the present invention is not limited in any way by these examples.

EXAMPLE A

For instance, the following four conditions may be cited as examples of color conditions desired in a yellow ink.
(a) Low coloring at a low duty, and high coloring at a high duty.
(b) $b^* \geq 95$ when $a^*=0$, and $a^* \leq -5$ when $b^*=95$.
(c) Little variation in the $b^*$ value when $-5 \leq a^* \leq 0$.
(d) Coloring with a low brightness and a high $b^*$ value is obtained at a low duty.

A yellow ink that satisfies the conditions (a) through (d) is superior in terms of color stability and color reproducibility. In particular, it is important that conditions (b) and (c) be satisfied. In the present example, a yellow ink composition according to the present invention and a yellow ink composition used as a comparative example were prepared, and an evaluation was performed in order to ascertain whether or not conditions (a) through (d) were satisfied.

(Ink Preparation)

Yellow ink compositions (Y1) and (Y2) containing the metal complex pigment PY 129 were prepared as yellow ink compositions of the present invention.

| <Example 1 (Y1)> | |
|---|---|
| C. I. pigment yellow 129 | 2.0 wt % |
| C. I. pigment yellow 74 | 1.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |
| <Example 2 (Y2)> | |
| C. I. pigment yellow 129 | 1.0 wt % |
| C. I. pigment yellow 74 | 2.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

Furthermore, yellow ink compositions (y1), (y2), (y3) and (y4) which did not contain the metal complex pigment PY 129 were prepared as comparative examples.

| <Comparative Example 1 (y1)> | |
|---|---|
| C. I. pigment yellow 110 | 2.0 wt % |
| C. I. pigment yellow 74 | 1.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |
| <Comparative Example 2 (y2)> | |
| C. I. pigment yellow 110 | 1.0 wt % |
| C. I. pigment yellow 74 | 2.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |
| <Comparative Example 3 (y3)> | |
| C. I. pigment yellow 110 | 3.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |
| <Comparative Example 4 (y4)> | |
| C. I. pigment yellow 74 | 3.0 wt % |
| Dispersing agent (styrene-acrylic acid copolymer) | 0.9 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

(Measurement of X Values, Y Values and Z Values of Dilute Aqueous Solutions of Respective Inks)

The abovementioned yellow inks (Y1), (Y2), (y1), (y2), (y3) and (y4) were diluted with pure water so that the Z value in the XYZ display system stipulated by the CIE as calculated from the ultraviolet-visible transmission spectrum was 23.0, thus preparing dilute aqueous solutions with a solid content concentration of 0.01 wt % or less.

In concrete terms, dilute aqueous solutions with concentrations of 0.0005 wt %, 0.0010 wt %, 0.0015 wt %, 0.0020 wt %, 0.0025 wt %, 0.0030 wt %, 0.0040 wt %, 0.0060 wt % and 0.0080 wt % were first prepared for each ink. Next, these respective aqueous solutions were measured as follows using a U3300 manufactured by Hitachi Seisakusho K.K. Specifically, two quartz cells with a capacity of 4 ml and dimensions of 1 cm length×1 cm width×4 cm height were prepared, and these were divided into sample side and reference side cells. Pure water was added to both cells, and these cells were set in the measuring part. A base line was measured, and this was set as the base line. Then, the ultraviolet-visible transmission spectrum was measured under the following measurement conditions: namely, the slit width of the light source lamp was set at 2 mm, the scanning speed of the measurement interval was set at 600 nm/min, the photomultiplier voltage was set at 200 V at a transmissivity of 0.0 to 100.0% T and a range of 380 to 800 nm, and the light source lamp was set as a D2 lamp and W1 lamp switched at 340 nm.

Next, while the reference side cell was left "as is", the pure water in the sample side cell was replaced with the respective aqueous solutions, and the ultraviolet-visible transmission spectra were respectively measured, and the X value, Y value and Z value in the XYZ display system stipulated by the CIE were calculated using a D65 light source at a visual field angle of 2 degrees.

These values were plotted in a graph and connected by a curve, and the X value and Y value at a Z value of 23.00 were determined from this curve.

Table 1 shows the pigments contained in the respective inks, the concentrations of these pigments, the dilution factors, and the measurement results.

TABLE 1

| | | Pigment type and amount | Dilution | X value | Y value | Z value |
|---|---|---|---|---|---|---|
| Example | Y1 | 74_1% + 129_2% | Approximately 2000 times | 75.4 | 87.1 | 23.0 |
| | Y2 | 74_2% + 129_1% | Approximately 2000 times | 75.6 | 86.4 | 23.0 |
| Comparative Example | y1 | 74_1% + 110_2% | Approximately 2000 times | 74.6 | 84.5 | 23.0 |
| | y2 | 74_2% + 110_1% | Approximately 2000 times | 76.0 | 85.4 | 23.0 |
| | y3 | 110_3% | Approximately 2000 times | 76.8 | 84.5 | 23.0 |
| | y4 | 74_3% | Approximately 3000 times | 75.0 | 85.3 | 23.0 |

The yellow inks (Y1) and (Y2) showed respective Y values of 87.1 and 86.4 when the Z value was 23.0, and thus showed Y values of 86 or greater. On the other hand, the yellow inks (y1) through (y4) all showed Y values of less than 86 when the Z value was 23.0.

Here, for reference, a yellow ink containing PY 129 and PY 74 at a concentration ratio of 2:1 was prepared in the same manner as Y1 as a yellow ink composition of the present invention, and the X value, Y value and Z value were measured with the dilute concentration varied. The results obtained are shown in Table 2.

TABLE 2

| Pigment type and amount | Dilution | X value | Y value | Z value |
|---|---|---|---|---|
| 74_2% + 129_4% | Approximately 4000 times | 76.45 | 87.85 | 23.10 |
| 74_2% + 129_4% | Approximately 2000 times | 68.75 | 77.18 | 6.15 |
| 74_0.5% + 129_1% | Approximately 2000 times | 82.52 | 93.28 | 46.97 |
| 74_0.5% + 129_1% | Approximately 1000 times | 76.37 | 87.80 | 22.95 |

It is seen that even when the proportions of PY 129 and PY 74 contained in the ink composition were the same, the X value, Y value and Z value fluctuated according to the total pigment concentration and dilution factor. However, in the case of the ink composition of the present invention, it was confirmed that the Y value was 86 or greater if a dilution factor which was such that the Z value was 23 was used.

(Measurement of L* Value, a* Value and b* Value, and Calculation of ΔE Value)

The yellow inks (Y1), (Y2), (y1), (y2), (y3) and (y4) were printed on media having a coating layer, and the L* value, a* value and b* value stipulated by the CIE were measured.

In concrete terms, each of the yellow inks was loaded into a PM900C ink jet printer (manufactured by Seiko-Epson K.K.), and was printed onto the abovementioned PGPP (manufactured by Seiko-Epson K.K.) as one example of a medium having a coating layer, thus producing respective samples of recorded matter. Printing was performed by discharging the respective yellow inks with the duty varied from 15% to 255% (ink weight 10 to 11 mg/inch$^2$).

The samples of printed matter thus obtained were measured using a Macbeth SPM50 manufactured by Gretag Co. with a D50 light source at a visual field angle of 2 degrees, and the L* value, a* value and b* value stipulated by the CIE were obtained.

The measurement results are shown in Tables 3 through 8.

TABLE 3

(Y1) PY74normal_1%/PY129_2%

| Duty | L* | a* | b* | (100 − L*) + b* | ΔE |
|---|---|---|---|---|---|
| 15 | 92.39 | −6.04 | 25.76 | 33.4 | 27.5 |
| 30 | 90.67 | −8.25 | 48.2 | 57.5 | 49.8 |
| 55 | 88.01 | −8.1 | 73.98 | 86.0 | 75.4 |
| 80 | 86.02 | −7.37 | 91.96 | 105.9 | 93.3 |
| 105 | 84.75 | −5.8 | 99.29 | 114.5 | 100.6 |
| 130 | 83.48 | −3.87 | 102.03 | 118.6 | 103.4 |
| 155 | 82.32 | −2.56 | 103.04 | 120.7 | 104.6 |
| 180 | 81.32 | −1.39 | 103.45 | 122.1 | 105.1 |
| 205 | 80.44 | −0.31 | 103.53 | 123.1 | 105.4 |
| 230 | 79.65 | 0.5 | 103.26 | 123.6 | 105.2 |
| 255 | 78.79 | 1.44 | 102.94 | 124.2 | 105.1 |

TABLE 4

(Y2) PY74normal_2%/PY129_1%

| Duty | L* | a* | b* | (100 − L*) + b* | ΔE |
|---|---|---|---|---|---|
| 15 | 92.96 | −6.77 | 30.4 | 37.4 | 31.9 |
| 30 | 91.36 | −9.2 | 56.7 | 65.3 | 58.1 |
| 55 | 88.95 | −8.22 | 84.06 | 95.1 | 85.2 |
| 80 | 86.98 | −7.38 | 97.58 | 110.6 | 98.7 |
| 105 | 86.05 | −5.26 | 102.16 | 116.1 | 103.2 |
| 130 | 85.01 | −3.51 | 104.07 | 119.1 | 105.2 |
| 155 | 84.1 | −2.37 | 104.81 | 120.7 | 106.0 |
| 180 | 83.27 | −1.1 | 104.97 | 121.7 | 106.3 |
| 205 | 82.45 | −0.08 | 104.96 | 122.5 | 106.4 |
| 230 | 81.76 | 0.78 | 104.72 | 123.0 | 106.3 |
| 255 | 81.13 | 1.71 | 104.67 | 123.5 | 106.4 |

TABLE 5

(y1) PY74normal_1%/PY110_2%

| Duty | L* | a* | b* | (100 − L*) + b* | ΔE |
|---|---|---|---|---|---|
| 255 | 81.17 | 16.12 | 112.32 | 131.2 | 115.0 |
| 230 | 81.64 | 14.72 | 112.08 | 130.4 | 114.5 |
| 205 | 82.21 | 13.15 | 111.53 | 129.3 | 113.7 |
| 180 | 82.65 | 11.37 | 110.61 | 128.0 | 112.5 |
| 155 | 83.32 | 9.78 | 109.55 | 126.2 | 111.2 |
| 130 | 84.11 | 7.5 | 106.22 | 122.1 | 107.7 |
| 105 | 85 | 5.04 | 101.86 | 116.9 | 103.1 |
| 80 | 86.23 | 2.39 | 92.39 | 106.2 | 93.4 |
| 55 | 87.92 | −1.04 | 74.68 | 86.8 | 75.7 |
| 30 | 90.29 | −4.02 | 46.16 | 55.9 | 47.3 |
| 15 | 92.23 | −3.28 | 23.45 | 31.2 | 24.9 |

TABLE 6

(y2) PY74normal_2%/PY110_1%

| Duty | L* | a* | b* | (100 − L*) + b* | ΔE |
|---|---|---|---|---|---|
| 255 | 83.1 | 12.16 | 110.52 | 127.4 | 112.5 |
| 230 | 83.4 | 11.02 | 110.2 | 126.8 | 112.0 |
| 205 | 83.83 | 9.65 | 109.94 | 126.1 | 111.5 |
| 180 | 84.25 | 7.97 | 109.33 | 125.1 | 110.7 |
| 155 | 84.83 | 6.31 | 108.6 | 123.8 | 109.8 |

TABLE 6-continued (y2)
PY74normal 2%/PY110 1%

| Duty | L* | a* | b* | (100 − L*) + b* | ΔE |
|---|---|---|---|---|---|
| 130 | 85.56 | 4.39 | 107.05 | 121.5 | 108.1 |
| 105 | 86.33 | 1.76 | 104.79 | 118.5 | 105.7 |
| 80 | 87.39 | −0.73 | 98.4 | 111.0 | 99.2 |
| 55 | 89.12 | −3.35 | 83.6 | 94.5 | 84.4 |
| 30 | 91.04 | −6.44 | 54.7 | 63.7 | 55.8 |
| 15 | 92.98 | −4.67 | 29.37 | 36.4 | 30.6 |

TABLE 7

(y3)
PY74normal 0%/PY110 3%

| Duty | L* | a* | b* | (100 − L*) + b* | ΔE |
|---|---|---|---|---|---|
| 255 | 81.31 | 16.57 | 116.84 | 135.5 | 119.5 |
| 230 | 81.71 | 14.73 | 114.08 | 132.4 | 116.5 |
| 205 | 82.17 | 13.15 | 110.93 | 128.8 | 113.1 |
| 180 | 82.67 | 11.77 | 106.8 | 124.1 | 108.8 |
| 155 | 83.29 | 10.2 | 101.42 | 118.1 | 103.3 |
| 130 | 84.06 | 8.16 | 93.9 | 109.8 | 95.6 |
| 105 | 84.75 | 6.22 | 85.66 | 100.9 | 87.2 |
| 80 | 86.04 | 4.12 | 72.74 | 86.7 | 74.2 |
| 55 | 88.07 | 1.28 | 55.32 | 67.3 | 56.6 |
| 30 | 90.11 | −1.22 | 31.71 | 41.6 | 33.2 |
| 15 | 92.24 | −1.18 | 15.4 | 23.2 | 17.3 |

TABLE 8

(y4) PY74normal 3%

| Duty | L* | a* | b* | (100 − L*) + b* | ΔE |
|---|---|---|---|---|---|
| 15 | 93.13 | −7.2 | 31.85 | 38.7 | 33.4 |
| 30 | 91.76 | −9.71 | 58.97 | 67.2 | 60.3 |
| 55 | 90.13 | −9.36 | 86.19 | 96.1 | 87.3 |
| 80 | 89.11 | −8.38 | 99.24 | 110.1 | 100.2 |
| 105 | 88.66 | −6.73 | 104.03 | 115.4 | 104.9 |
| 130 | 88.31 | −5.56 | 105.66 | 117.4 | 106.5 |
| 155 | 88.08 | −4.96 | 107.05 | 119.0 | 107.8 |
| 180 | 87.83 | −3.94 | 107.93 | 120.1 | 108.7 |
| 205 | 87.74 | −3.14 | 108.64 | 120.9 | 109.4 |
| 230 | 87.58 | −2.58 | 109.02 | 121.4 | 109.8 |
| 255 | 87.45 | −1.85 | 109.32 | 121.9 | 110.1 |

FIG. 1 shows a graph with the a* values in Tables 3 through 8 plotted on the horizontal axis, and the b* values plotted on the vertical axis.

It is seen from FIG. 1 that only (Y1), (Y2) and (y4) satisfy conditions (b) and (c). In cases where a yellow ink composition satisfying these conditions is used in an ink set, the resulting images are superior in terms of red color reproduction and green color reproduction; furthermore, color adjustment of a pure yellow color in the vicinity of the a* axis and with a high b* value is possible without any dependence on the cyan ink, and there is little variation in the color according to the amount of ink that is discharged.

Furthermore, Table 9 shows selected ΔE values at a duty of 15% in the abovementioned Tables 3 through 8. The ΔE value is a value indicating the distance from the origin (color density) in the L*a*b* coordinate system, and can be determined by the following equation:

$$\Delta E = \{(L^*-0)^2 + (a^*-0)^2 + (b^*-0)^2\}^{1/2}$$

TABLE 9

| Duty 15% | ΔE |
|---|---|
| Example 1 | 27.5 |
| Example 2 | 31.9 |
| Comparative Example 1 | 24.9 |
| Comparative Example 2 | 30.6 |
| Comparative Example 3 | 17.3 |
| Comparative Example 4 | 33.4 |

It may be said from Table 9 that at a low duty (15%), the yellow ink compositions of Examples 1 and 2 (Y1 and Y2) and Comparative Examples 1 through 3 (y1 through y3) show less difference in color due to variation in the ink discharge weight than Comparative Example 4 (y4), and that these yellow ink compositions are therefore superior to y4 in terms of color stability.

Figure 2:
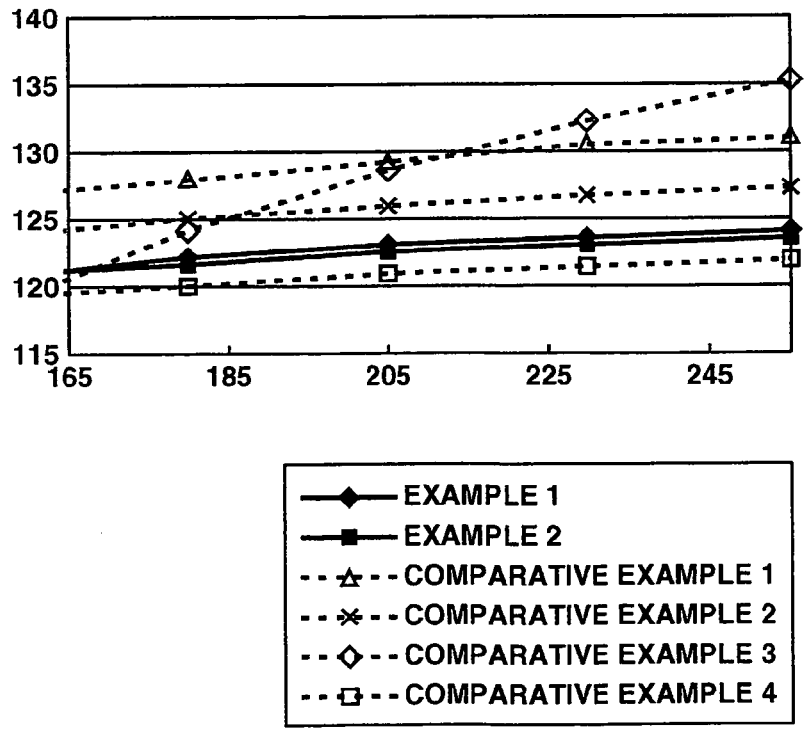
FIG. 2 shows the relationship between the duty (%) and b* value in the embodiments and comparative examples.

Furthermore, FIG. 2 shows a graph in which the duty (165% to 255%) in the abovementioned Tables 3 through 8 is plotted on the horizontal axis, and the value of (100−L*)+b* is plotted on the vertical axis.

It is seen from FIG. 2 that Comparative Example 4 (y4) is most inferior among the 6 examples in terms of coloring at a low brightness and high b* value. Taken together with the results shown in Table 9, this indicates that y4 does not satisfy condition (a) at either a low duty or a high duty.

It was confirmed from the above results that only the two yellow ink compositions of Example 1 (Y1) and Example 2 (Y2) satisfy the most important conditions (b) and (c) and also satisfy the conditions (a) and (d).

EXAMPLE B (Preparation of Ink Set)

Yellow inks (Y1), (Y2), (y1) and (y2), magenta inks (M1), (M2) and (M3), cyan inks (C1) and (C2), a photo-black ink (PK1) and a matte black ink (MK1) of the compositions shown below in the respective ink sets of the examples and comparative examples were respectively prepared by ordinary methods. Specifically, the coloring agent components and dispersing components were dispersed together; then, the other components were added and mixed, and insoluble components exceeding a fixed size were filtered out, thus producing inks. The respective inks thus obtained were combined to produce the ink sets of the respective examples and comparative examples.

The yellow inks (Y1) and (Y2) contained C. I. pigment yellow 129 (a metal complex pigment) as a coloring material, while (y1) and (y2) did not contain C. I. pigment yellow 129.

<Yellow Ink (Y1)>

| | |
|---|---|
| C. I. pigment yellow 129 | 1.0 wt % |
| C. I. pigment yellow 74 | 1.0 wt % |
| Dispersing agent (styrene-acrylic acid copolymer) | 0.8 wt % |
| Glycerol | 20.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Yellow Ink (Y2)>

| | |
|---|---|
| C. I. pigment yellow 129 | 1.0 wt % |

| | |
|---|---|
| C. I. pigment yellow 74 | 3.0 wt % |
| Dispersing agent (styrene-acrylic acid copolymer) | 1.6 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Yellow Ink (y1)>

| | |
|---|---|
| C. I. pigment yellow 74 | 3.0 wt % |
| Dispersing agent (styrene-acrylic acid copolymer) | 1.8 wt % |
| Glycerol | 20.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Yellow Ink (y2)>

| | |
|---|---|
| C. I. pigment yellow 74 | 6.0 wt % |
| Dispersing agent (styrene-acrylic acid copolymer) | 2.4 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Magenta Ink (M1)>

| | |
|---|---|
| C. I. pigment violet 19 | 2.0 wt % |
| Dispersing agent (styrene-acrylic acid copolymer) | 0.8 wt % |
| Glycerol | 20.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Magenta Ink (M2)>

| | |
|---|---|
| C. I. pigment violet 19 | 4.0 wt % |
| Dispersing agent (styrene-acrylic acid copolymer) | 1.6 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Magenta Ink (M3)>

| | |
|---|---|
| C. I. pigment red 122 | 4.0 wt % |
| Dispersing agent (styrene-acrylic acid copolymer) | 1.6 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Cyan Ink (C1)>

| | |
|---|---|
| C. I. pigment blue 15:3 | 1.5 wt % |
| Dispersing agent (styrene-acrylic acid copolymer) | 0.6 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Cyan Ink (C2)>

| | |
|---|---|
| C. I. pigment blue 15:3 | 4.0 wt % |
| Dispersing agent (styrene-acrylic acid copolymer) | 1.6 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Photo-Black Ink (PK1)>

| | |
|---|---|
| Carbon black | 2.0 wt % |
| Dispersing agent (styrene-acrylic acid copolymer) | 2.0 wt % |
| Glycerol | 15.0 wt % |
| 1,2-Hexanediol | 7.0 wt % |
| Triethanolamine | 0.9 wt % |
| BYK348 | 0.1 wt % |
| Ultra-pure water | balance |
| Total | 100.0 wt % |

<Matte Black Ink (MK1)>

| | |
|---|---|
| Self-dispersing carbon black | 6.0 wt % |
| Glycerol | 12.0 wt % |
| 1,2-Hexanediol | 3.0 wt % |
| Triethanolamine | 0.9 wt % |
| BYK348 | 0.1 wt % |
| Ultra-pure water | balance |
| Total | 100.0 wt % |

In regard to the dilute aqueous solutions of the above-mentioned yellow inks (Y1), (Y2), (y1) and (y2), magenta inks (M1) and (M2), and cyan inks (C1) and (C2), dilute aqueous solutions with a pigment solid content concentration of 0.01 wt % or less were prepared by dilution with pure water so that the Z value in the XYZ display system stipulated by the CIE was 23.00, as calculated from the ultraviolet-visible transmission spectrum.

In concrete terms, dilute aqueous solutions with concentrations of 0.0005 wt %, 0.0010 wt %, 0.0015 wt %, 0.0020 wt %, 0.0025 wt %, 0.0030 wt %, 0.0040 wt %, 0.0060 wt % and 0.0080 wt % were first prepared for each ink. Next, these respective aqueous solutions were measured as follows using a U3300 manufactured by Hitachi Seisakusho K.K. Specifically, two quartz cells with a capacity of 4 ml and dimensions of 1 cm length×1 cm width×4 cm height were prepared, and these were divided into sample side and reference side cells. Pure water was added to both cells, and these cells were set in the measuring part. A base line was measured, and this was set as the base line. Then, the ultraviolet-visible transmission spectrum was measured under the following measurement conditions: namely, the slit width of the light source lamp was set at 2 mm, the scanning speed of the measurement interval was set at 600 nm/min, the photomultiplier voltage was set at 200 V at a transmissivity of 0.0 to 100.0% T and a range of 380 to 800 nm, and the light source lamp was set as a D2 lamp and W1 lamp switched at 340 nm.

Next, while the reference side cell was left "as is", the pure water in the sample side cell was replaced with the respective aqueous solutions, and the ultraviolet-visible transmission spectra were respectively measured, and the X value, Y value and Z value in the XYZ display system stipulated by the CIE were calculated using a D65 light source at a visual field angle of 2 degrees.

These values were plotted in a graph and connected by a curve, and the X value and Y value at a Z value of 23.00 were determined from this curve.

Table 10 shows the pigments contained in the respective inks, the concentrations of these pigments, the dilution factors, and the measurement results.

TABLE 10

| Ink | Pigment | Dilution | X | Y | Z |
|---|---|---|---|---|---|
| Y1 | PY74_1% + PY129_1% | Approximately 1000 times | 76.47 | 89.65 | 23.00 |
| Y2 | PY74_3% + PY129_1% | Approximately 2000 times | 76.12 | 88.90 | 23.00 |
| y1 | PY74_3% | Approximately 3000 times | 74.99 | 85.33 | 23.00 |
| y2 | PY74_6% | Approximately 6000 times | 74.99 | 85.33 | 23.00 |
| M1 | PV19_2% | 1000 times | 71.82 | 56.08 | 77.58 |
| C1 | PB15:3_1.5% | 750 times | 32.06 | 46.84 | 95.40 |
| M1 | PV19_4% | 2000 times | 71.82 | 56.08 | 77.58 |
| C1 | PB15:3_4% | 2000 times | 32.06 | 46.84 | 95.40 |

The yellow inks (Y1) and (Y2) showed respective Y values of 89.65 and 88.90 when the Z value was 23.0, and thus showed Y values of 86 or greater. On the other hand, the yellow inks (y1) and (y2) both showed Y values of 85.33 when the Z value was 23.0.

(Color Reproducibility Evaluation 1)

Next, as one method of evaluating the color reproducibility of the yellow inks (Y1), (Y2), (y1) and (y2), the respective yellow inks and the photo-black ink were printed onto a medium having a coating layer, and the L* value and b* value stipulated by the CIE were measured.

In concrete terms, In concrete terms, each of the yellow inks and the photo-black ink were loaded into a PM900C ink jet printer (manufactured by Seiko-Epson K.K.), and were printed onto the abovementioned PGPP (manufactured by Seiko-Epson K.K.) as one example of a medium having a coating layer, thus producing respective samples of recorded matter. Printing was performed by discharging the respective yellow inks and the photo-black ink in the proportions shown in Table 11 with the duty set at 120% (ink weight 10 to 11 mg/inch$^2$).

TABLE 11

| Proportion of yellow ink | 100 | 90 | 80 | 70 | 60 | 50 | 40 | 30 | 20 | 10 | 0 |
|---|---|---|---|---|---|---|---|---|---|---|---|
| Proportion of photo-black ink | 0 | 10 | 20 | 30 | 40 | 50 | 60 | 70 | 80 | 90 | 100 |

The samples of printed matter thus obtained were measured using a Macbeth SPM50 manufactured by Gretag Co. with a D50 light source at a visual field angle of 2 degrees, and the L* value, and b* value stipulated by the CIE were obtained.

The results are shown in FIGS. 3 and 4. FIG. 3 shows results comparing Y1 (Example 1) and y1 (Comparative Example 1) which are both relatively thin yellow inks, while FIG. 4 shows results comparing Y2 (Example 2) and y2 (Comparative Example 2) which are both relatively thick yellow inks.

In both cases, in spite of the fact that the pigment sold content is low compared to the comparative examples, there is a lowering of the L* value and an increase in the b* value. It was confirmed that the low-brightness yellow region could be expressed with good reproducibility.

(Evaluation of Color Reproducibility in Red Region)

Five types of ink sets were prepared as shown in Table 12. The respective inks of each ink set were loaded into a PM900C ink jet printer, and were printed onto PGPP at a resolution of 720×720, thus producing recorded matter.

TABLE 12

| | Yellow ink | Magenta ink | Cyan ink | Photo-black ink | Matte black ink |
|---|---|---|---|---|---|
| Example ink set (1) | Y1 | M1 | C1 | PK | MK |
| Example ink set (2) | Y2 | M2 | C2 | PK | MK |
| Example ink set (3) | Y2 | M3 | C2 | PK | MK |
| Comparative example ink set (1) | y1 | M1 | C1 | PK | MK |
| Comparative example ink set (2) | y2 | M2 | C2 | PK | MK |

Tables 13 through 15 show the approximate ink weights of the respective inks during printing. The respective cells of the rows and columns of Tables 13 through 15 stipulate the locations of printing; Table 13 indicates the yellow ink, Table 14 indicates the magenta ink, and Table 15 indicates the photo-black ink.

TABLE 13

| | | | | | | | | | | |
|---|---|---|---|---|---|---|---|---|---|---|
| 10.5 | 10.0 | 9.5 | 8.8 | 7.5 | 6.3 | 5.0 | 3.8 | 2.4 | 1.1 | 0.0 |
| 10.4 | 10.0 | 9.4 | 8.7 | 7.5 | 6.2 | 5.0 | 3.7 | 2.4 | 1.1 | 0.0 |
| 10.3 | 9.9 | 9.4 | 8.7 | 7.4 | 6.2 | 5.0 | 3.7 | 2.3 | 1.1 | 0.0 |
| 10.3 | 9.8 | 9.3 | 8.6 | 7.4 | 6.2 | 4.9 | 3.7 | 2.3 | 1.1 | 0.0 |
| 10.2 | 9.8 | 9.2 | 8.6 | 7.3 | 6.1 | 4.9 | 3.7 | 2.3 | 1.1 | 0.0 |
| 10.1 | 9.7 | 9.2 | 8.5 | 7.3 | 6.1 | 4.9 | 3.7 | 2.3 | 1.1 | 0.0 |
| 10.1 | 9.7 | 9.1 | 8.5 | 7.3 | 6.0 | 4.8 | 3.6 | 2.3 | 1.1 | 0.0 |
| 10.0 | 9.6 | 9.1 | 8.4 | 7.2 | 6.0 | 4.8 | 3.6 | 2.3 | 1.1 | 0.0 |

TABLE 14

| | | | | | | | | | | |
|---|---|---|---|---|---|---|---|---|---|---|
| 0.0 | 1.1 | 2.4 | 3.8 | 5.0 | 6.3 | 7.5 | 8.8 | 9.5 | 10.0 | 10.5 |
| 0.0 | 1.1 | 2.4 | 3.7 | 5.0 | 6.2 | 7.5 | 8.7 | 9.4 | 10.0 | 10.4 |
| 0.0 | 1.1 | 2.3 | 3.7 | 5.0 | 6.2 | 7.4 | 8.7 | 9.4 | 9.9 | 10.3 |
| 0.0 | 1.1 | 2.3 | 3.7 | 4.9 | 6.2 | 7.4 | 8.6 | 9.3 | 9.8 | 10.3 |
| 0.0 | 1.1 | 2.3 | 3.7 | 4.9 | 6.1 | 7.3 | 8.6 | 9.2 | 9.8 | 10.2 |

TABLE 14-continued

| | | | | | | | | | | |
|---|---|---|---|---|---|---|---|---|---|---|
| 0.0 | 1.1 | 2.3 | 3.7 | 4.9 | 6.1 | 7.3 | 8.5 | 9.2 | 9.7 | 10.1 |
| 0.0 | 1.1 | 2.3 | 3.6 | 4.8 | 6.0 | 7.3 | 8.5 | 9.1 | 9.7 | 10.1 |
| 0.0 | 1.1 | 2.3 | 3.6 | 4.8 | 6.0 | 7.2 | 8.4 | 9.1 | 9.6 | 10.0 |

TABLE 15

| | | | | | | | | | | |
|---|---|---|---|---|---|---|---|---|---|---|
| 0.0 | 0.0 | 0.0 | 0.0 | 0.0 | 0.0 | 0.0 | 0.0 | 0.0 | 0.0 | 0.0 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.2 | 0.2 | 0.2 | 0.2 | 0.2 | 0.1 | 0.1 | 0.1 |
| 0.2 | 0.2 | 0.2 | 0.2 | 0.2 | 0.2 | 0.2 | 0.2 | 0.2 | 0.2 | 0.2 |
| 0.3 | 0.3 | 0.3 | 0.3 | 0.3 | 0.3 | 0.3 | 0.3 | 0.3 | 0.3 | 0.3 |
| 0.3 | 0.3 | 0.4 | 0.4 | 0.4 | 0.4 | 0.4 | 0.4 | 0.4 | 0.3 | 0.3 |
| 0.4 | 0.4 | 0.4 | 0.5 | 0.5 | 0.5 | 0.5 | 0.5 | 0.4 | 0.4 | 0.4 |
| 0.4 | 0.5 | 0.5 | 0.5 | 0.5 | 0.5 | 0.5 | 0.5 | 0.5 | 0.5 | 0.4 |

Figure 5:
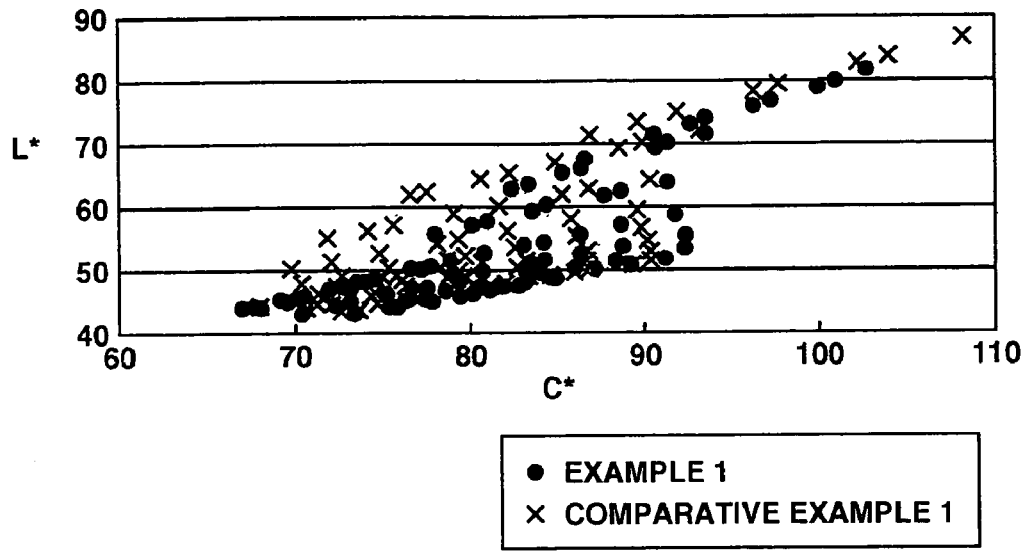
FIG. 5 shows the evaluation results for color reproducibility in the red region of the ink set of the present invention.
Figure 6:
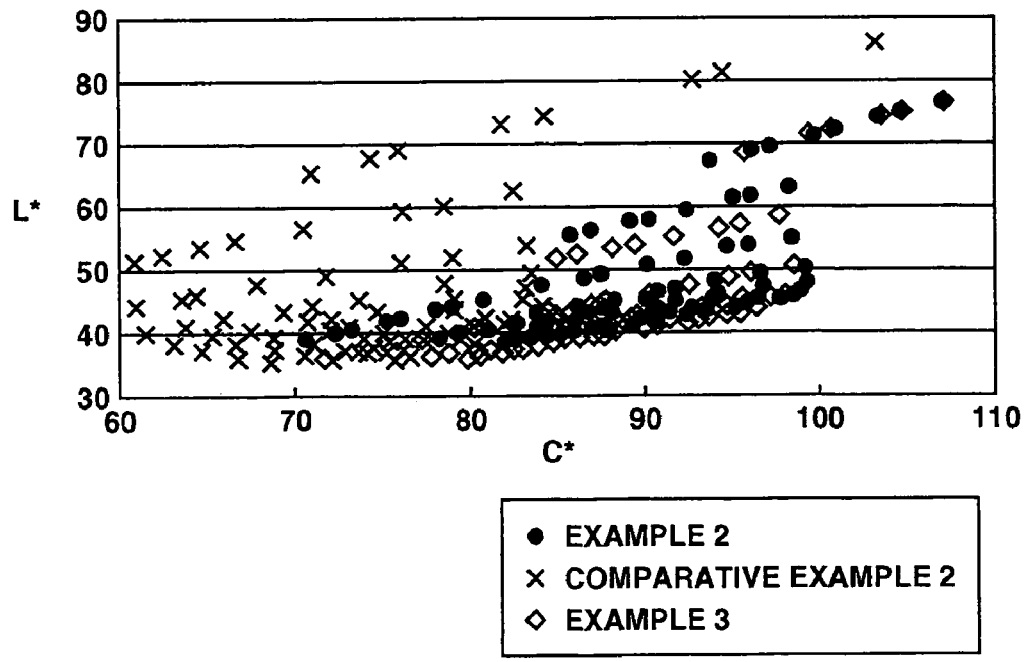
FIG. 6 shows the evaluation results for color reproducibility in the red region of the ink set of the present invention.

The samples of recorded matter thus obtained were measured with a D50 light source at a visual field angle of 2 degrees using a Macbeth SPM50 manufactured by Gretag Co., and the L* value, a* value and b* value stipulated by the CIE were obtained. C* was obtained from these values using the following equation, and the results were plotted in a graph with C* being plotted on the horizontal axis, and L* being plotted on the vertical axis.

$$C^* = (a^{*2} + b^{*2})^{1/2}$$ Equation:

The results are shown in FIGS. 5 and 6.

The examples show little variation compared to the comparative examples, thus confirming that the present invention is superior in terms of color reproducibility in the red region.

(Evaluation of Color Reproducibility in Green Region)

Five types of ink sets similar to those used in the evaluation of color reproducibility in the red region were prepared; then, the respective inks of each ink set were loaded into a PM900C ink jet printer, and were printed onto PGPP at a resolution of 720×720, thus producing recorded matter.

Tables 16 through 18 show the approximate ink weights of the respective inks during printing. The respective cells of the rows and columns of Tables 16 through 18 stipulate the locations of printing; Table 16 indicates the yellow ink, Table 17 indicates the cyan ink, and Table 18 indicates the photo-black ink.

TABLE 16

| 10.5 | 10.0 | 9.5 | 8.8 | 7.5 | 6.3 | 5.0 | 3.8 | 2.4 | 1.1 | 0.0 |
| 10.4 | 10.0 | 9.4 | 8.7 | 7.5 | 6.2 | 5.0 | 3.7 | 2.4 | 1.1 | 0.0 |
| 10.3 | 9.9 | 9.4 | 8.7 | 7.4 | 6.2 | 5.0 | 3.7 | 2.3 | 1.1 | 0.0 |
| 10.3 | 9.8 | 9.3 | 8.6 | 7.4 | 6.2 | 4.9 | 3.7 | 2.3 | 1.1 | 0.0 |
| 10.2 | 9.8 | 9.2 | 8.6 | 7.3 | 6.1 | 4.9 | 3.7 | 2.3 | 1.1 | 0.0 |
| 10.1 | 9.7 | 9.2 | 8.5 | 7.3 | 6.1 | 4.9 | 3.7 | 2.3 | 1.1 | 0.0 |
| 10.1 | 9.7 | 9.1 | 8.5 | 7.3 | 6.0 | 4.8 | 3.6 | 2.3 | 1.1 | 0.0 |
| 10.0 | 9.6 | 9.1 | 8.4 | 7.2 | 6.0 | 4.8 | 3.6 | 2.3 | 1.1 | 0.0 |

TABLE 17

| 0.0 | 1.1 | 2.4 | 3.8 | 5.0 | 6.3 | 7.5 | 8.8 | 9.5 | 10.0 | 10.5 |
| 0.0 | 1.1 | 2.4 | 3.7 | 5.0 | 6.2 | 7.5 | 8.7 | 9.4 | 10.0 | 10.4 |
| 0.0 | 1.1 | 2.3 | 3.7 | 5.0 | 6.2 | 7.4 | 8.7 | 9.4 | 9.9 | 10.3 |
| 0.0 | 1.1 | 2.3 | 3.7 | 4.9 | 6.2 | 7.4 | 8.6 | 9.3 | 9.8 | 10.3 |
| 0.0 | 1.1 | 2.3 | 3.7 | 4.9 | 6.1 | 7.3 | 8.6 | 9.2 | 9.8 | 10.2 |
| 0.0 | 1.1 | 2.3 | 3.7 | 4.9 | 6.1 | 7.3 | 8.5 | 9.2 | 9.7 | 10.1 |
| 0.0 | 1.1 | 2.3 | 3.6 | 4.8 | 6.0 | 7.3 | 8.5 | 9.1 | 9.7 | 10.1 |
| 0.0 | 1.1 | 2.3 | 3.6 | 4.8 | 6.0 | 7.2 | 8.4 | 9.1 | 9.6 | 10.0 |

TABLE 18

| 0.0 | 0.0 | 0.0 | 0.0 | 0.0 | 0.0 | 0.0 | 0.0 | 0.0 | 0.0 | 0.0 |
| 0.1 | 0.1 | 0.1 | 0.1 | 0.1 | 0.1 | 0.1 | 0.1 | 0.1 | 0.1 | 0.1 |
| 0.1 | 0.1 | 0.1 | 0.2 | 0.2 | 0.2 | 0.2 | 0.2 | 0.1 | 0.1 | 0.1 |
| 0.2 | 0.2 | 0.2 | 0.2 | 0.2 | 0.2 | 0.2 | 0.2 | 0.2 | 0.2 | 0.2 |
| 0.3 | 0.3 | 0.3 | 0.3 | 0.3 | 0.3 | 0.3 | 0.3 | 0.3 | 0.3 | 0.3 |
| 0.3 | 0.3 | 0.4 | 0.4 | 0.4 | 0.4 | 0.4 | 0.4 | 0.4 | 0.3 | 0.3 |
| 0.4 | 0.4 | 0.4 | 0.5 | 0.5 | 0.5 | 0.5 | 0.5 | 0.4 | 0.4 | 0.4 |
| 0.4 | 0.5 | 0.5 | 0.5 | 0.5 | 0.5 | 0.5 | 0.5 | 0.5 | 0.5 | 0.4 |

The samples of recorded matter thus obtained were measured with a D50 light source at a visual field angle of 2 degrees using a Macbeth SPM50 manufactured by Gretag Co., and the L* value, a* value and b* value stipulated by the CIE were obtained. C* was determined from these values using the abovementioned equation, and the results were plotted in a graph with C* being plotted on the horizontal axis, and L* being plotted on the vertical axis.

Figure 7:
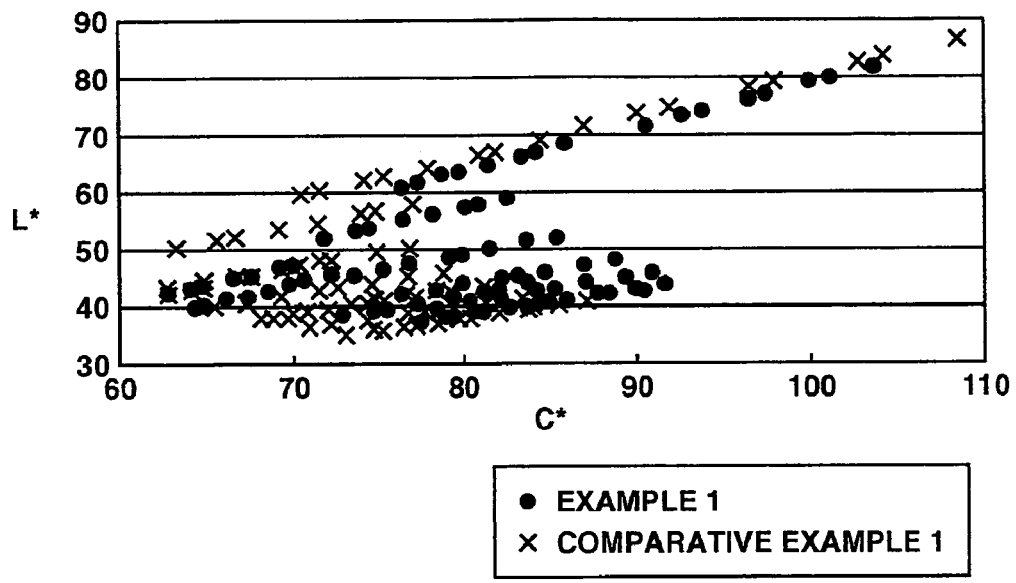
FIG. 7 shows the evaluation results for color reproducibility in the green region of the ink set of the present invention.
Figure 8:
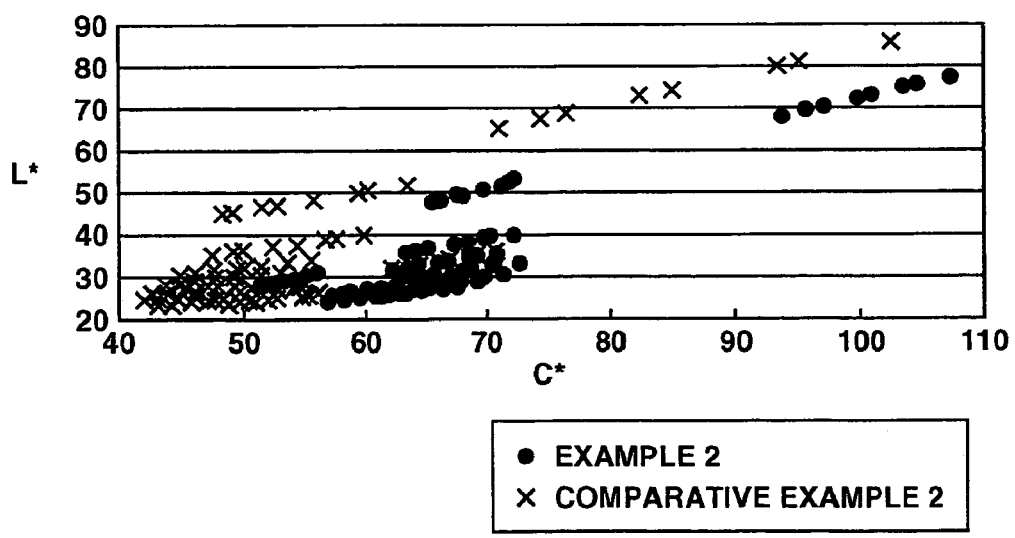
FIG. 8 shows the evaluation results for color reproducibility in the green region of the ink set of the present invention.

The results are shown in FIGS. 7 and 8.

The examples show little variation compared to the comparative examples, thus confirming that the present invention is superior in terms of color reproducibility in the red region.

We claim:

1. A yellow ink composition comprising a metal complex pigment which is C.I. pigment yellow 129 and at least one pigment selected from the group consisting of C.I. pigment yellow 74, 93, 109, 110, 128, 138, 150, 151, 154, 155, 180 and 185, wherein the composition has a Y value that is 86 or greater when the Z value in the XYZ display system stipulated by the CIE is 23.

2. The yellow ink composition according to claim 1, wherein said metal complex pigment is contained at the rate of at least 10 wt % of the total pigment solid content contained in said yellow ink.

3. The yellow ink composition according to claim 1, which contains a dispersing agent that is used to disperse the pigment along with the pigment as a coloring material, at the rate of 10 to 140 wt % relative to said pigment.

4. The yellow ink composition according to claim 1, which contains a high-boiling-point organic solvent at the rate of 0.1 to 30 wt %.

5. The yellow ink composition according to claim 1, which contains a permeation accelerating agent at the rate of 1 to 20 wt %.

6. The yellow ink composition according to claim 1, which contains at least one of an acetylene glycol type compound or a silicone type compound, at the rate of 0.01 to 5 wt %.

7. An ink cartridge which contains the yellow ink composition according to claim 1.

8. A recording method for forming images comprising depositing the yellow ink composition according to claim 1 on a recording medium.

9. A recording system for forming images comprising the yellow ink composition according to claim 1.

10. Recorded matter wherein images are formed using the yellow ink composition according to claim 1.

11. An ink set comprising a plurality of inks including a yellow ink comprising a metal complex pigment which is C.I. pigment yellow 129, and at least one pigment selected from the group consisting of C.I. pigment yellow 74, 93, 109, 110, 128, 138, 150, 151, 154, 155, and 185, wherein the yellow ink has a Y value of 86 or greater when the Z value in the XYZ display system stipulated by the CIE is 23, as calculated from the ultraviolet-visible transmission spectrum of an aqueous solution diluted 10,000 times by weight or lower.

12. The ink set according to claim 11, wherein said metal complex pigment is contained at the rate of at least 10 wt % of the total pigment solid content contained in said yellow ink.

13. The ink set according to claim 11, which further comprises a magenta ink and a cyan ink.

14. The ink set according to claim 13, which further comprises a black ink.

15. The ink set according to claim 13, wherein said magenta ink contains C.I. pigment violet 19 or C.I. pigment red 122 as a pigment, said cyan ink contains C.I. pigment blue 15:3 as a pigment, and said black ink contains carbon black as a pigment.

16. The ink set according to claim 11, wherein said each of the plurality of inks contains a pigment and a dispersing agent with the respective dispersing agents being used to disperse the pigments along with said pigments as respective coloring materials, at the rate of 10 to 140 wt % relative to said pigments.

17. The ink set according to claim 11, wherein each of said plurality of inks contains a high-boiling-point organic solvent at the rate of 0.1 to 30 wt %.

18. The ink set according to claim 11, wherein each of said plurality of inks contains a permeation accelerating agent at the rate of 1 to 20 wt %.

19. The ink set according to claim 11, wherein each of said plurality of inks contains at least one of an acetylene glycol type compound or a silicone type compound, at the rate of 0.01 to 5 wt %.

20. An ink cartridge which contains the ink set according to claim 11.

21. A recording method for forming images comprising depositing each of the plurality of inks of the ink set according to claim 11 onto a recording medium.

22. A recording system for forming images comprising the ink set according to claim 11.

23. Recorded matter wherein images are formed using the ink set according to claim 11.

* * * * *